(12) United States Patent
De Vorchik et al.

(10) Patent No.: US 7,263,562 B2
(45) Date of Patent: Aug. 28, 2007

(54) METHOD AND SYSTEM FOR DESCRIBING UPLOADED FILES STATEMENT REGARDING FEDERALLY-SPONSORED RESEARCH OR DEVELOPMENT

(75) Inventors: David George De Vorchik, Seattle, WA (US); David Joel Sheldon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 10/104,075

(22) Filed: Mar. 21, 2002

(65) Prior Publication Data

US 2003/0182359 A1    Sep. 25, 2003

(51) Int. Cl.
G06F 15/16    (2006.01)

(52) U.S. Cl. .................. 709/246; 709/203; 709/205; 709/216; 709/219; 709/226; 709/227; 709/231; 709/232

(58) Field of Classification Search ................ 709/203, 709/205, 219, 226, 232, 246, 227, 231, 216
See application file for complete search history.

(56) References Cited

U.S. PATENT DOCUMENTS

| | | | | |
|---|---|---|---|---|
| 5,564,001 A | * | 10/1996 | Lewis | 715/500.1 |
| 5,813,017 A | * | 9/1998 | Morris | 707/204 |
| 5,920,725 A | * | 7/1999 | Ma et al. | 717/171 |
| 5,991,816 A | * | 11/1999 | Percival et al. | 709/247 |
| 6,003,087 A | * | 12/1999 | Housel et al. | 709/229 |
| 6,006,231 A | * | 12/1999 | Popa | 707/101 |
| 6,049,390 A | * | 4/2000 | Notredame et al. | 358/1.15 |
| 6,074,434 A | * | 6/2000 | Cole et al. | 717/173 |
| 6,144,375 A | * | 11/2000 | Jain et al. | 715/500.1 |
| 6,144,996 A | * | 11/2000 | Starnes et al. | 709/217 |
| 6,185,625 B1 | * | 2/2001 | Tso et al. | 709/247 |
| 6,246,797 B1 | * | 6/2001 | Castor et al. | 382/232 |
| 6,324,521 B1 | * | 11/2001 | Shiota et al. | 705/27 |
| 6,374,260 B1 | * | 4/2002 | Hoffert et al. | 707/104.1 |
| 6,389,460 B1 | * | 5/2002 | Stewart et al. | 709/217 |
| 6,487,597 B1 | * | 11/2002 | Horie et al. | 709/227 |
| 6,560,639 B1 | * | 5/2003 | Dan et al. | 709/218 |
| 6,567,847 B1 | * | 5/2003 | Inoue | 709/219 |
| 6,571,246 B1 | * | 5/2003 | Anderson et al. | 707/10 |
| 6,583,799 B1 | * | 6/2003 | Manolis et al. | 715/838 |
| 6,587,839 B1 | * | 7/2003 | McIntyre et al. | 705/27 |
| 6,651,074 B1 | * | 11/2003 | Taylor | 707/204 |
| 6,721,802 B1 | * | 4/2004 | Wright et al. | 709/246 |
| 6,871,231 B2 | * | 3/2005 | Morris | 709/225 |
| 6,901,446 B2 | * | 5/2005 | Chellis et al. | 709/226 |
| 6,910,072 B2 | * | 6/2005 | Macleod Beck et al. | 709/224 |
| 6,915,482 B2 | * | 7/2005 | Jellum et al. | 715/511 |
| 6,947,598 B2 | * | 9/2005 | Yogeshwar et al. | 382/232 |
| 6,950,668 B2 | * | 9/2005 | Brassil et al. | 455/517 |
| 6,976,028 B2 | * | 12/2005 | Fenton et al. | 707/102 |

(Continued)

*Primary Examiner*—Michael Won
(74) *Attorney, Agent, or Firm*—Shook, Hardy & Bacon L.L.P.

(57) ABSTRACT

The present invention is directed to a method and system for use on a computer for uploading information from a client to a server by describing on the client side, a text file which identifies and describes files to be uploaded, along with other information to be passed between both systems. The present invention further allows the destination to refine the contents of the text file, to identify the files that the server requires, or to further specify how to transform any other related data. The source, client is then able to read this refined information and accordingly upload information to the server.

22 Claims, 3 Drawing Sheets

U.S. PATENT DOCUMENTS

| | | | |
|---|---|---|---|
| 6,976,090 B2* | 12/2005 | Ben-Shaul et al. | 709/246 |
| 7,024,488 B1* | 4/2006 | Sah | 709/240 |
| 7,103,099 B1* | 9/2006 | Paz et al. | 375/240.03 |
| 2002/0032027 A1* | 3/2002 | Kirani et al. | 455/426 |
| 2002/0033844 A1* | 3/2002 | Levy et al. | 345/744 |
| 2002/0083124 A1* | 6/2002 | Knox et al. | 709/203 |
| 2002/0184307 A1* | 12/2002 | Pineau | 709/203 |
| 2002/0194195 A1* | 12/2002 | Fenton et al. | 707/104.1 |
| 2002/0198944 A1* | 12/2002 | Moss | 709/206 |
| 2003/0163552 A1* | 8/2003 | Savitzky et al. | 709/219 |

* cited by examiner

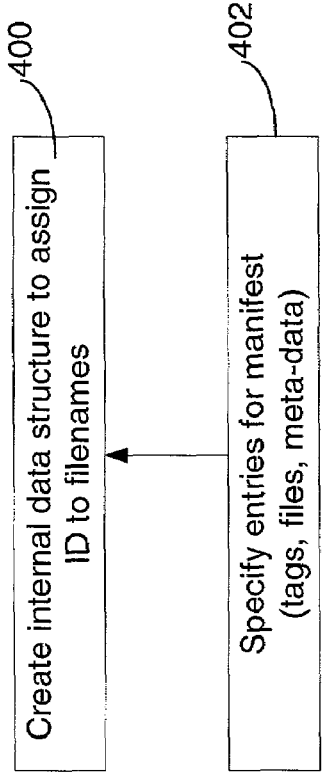
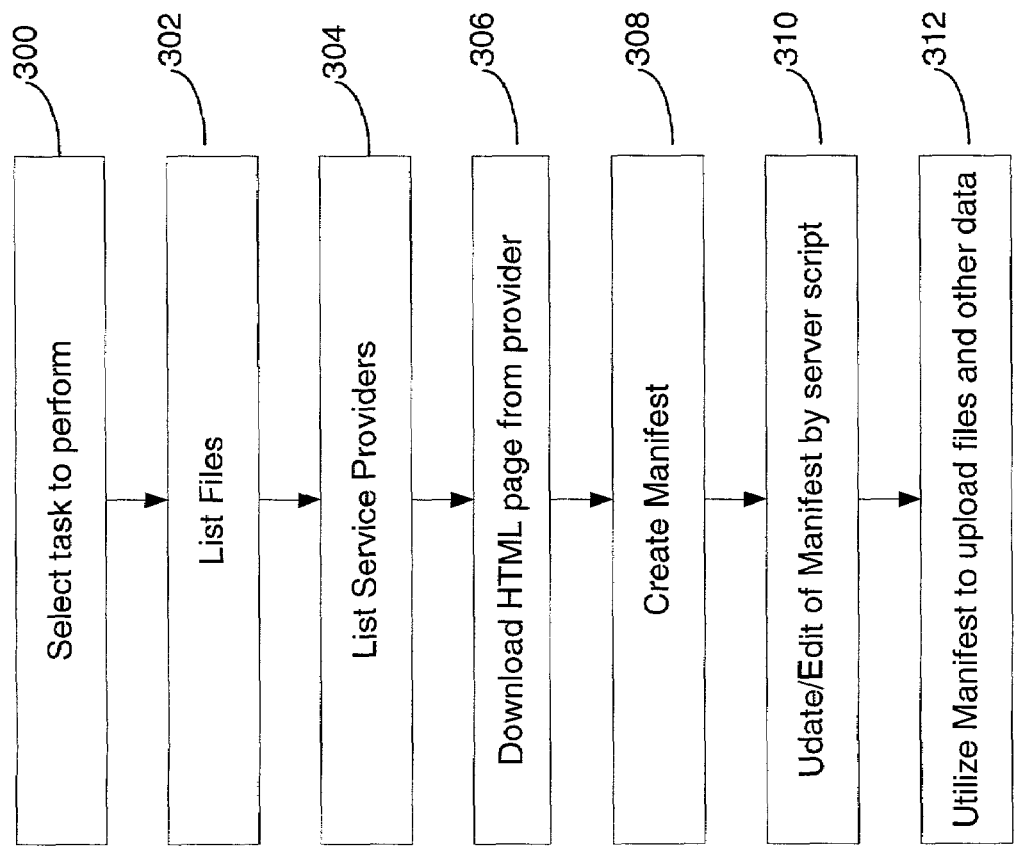
FIG. 4
FIG. 3

METHOD AND SYSTEM FOR DESCRIBING UPLOADED FILES STATEMENT REGARDING FEDERALLY-SPONSORED RESEARCH OR DEVELOPMENT

STATEMENT REGARDING FEDERALLY-SPONSORED RESEARCH OR DEVELOPMENT

None.

CROSS-REFERENCE TO RELATED APPLICATIONS

None.

TECHNICAL FIELD

The present invention relates to software program modules. More particularly, the invention relates to a system and method for describing files to be uploaded by a client computer and for allowing a destination system to define required data and data transforms.

BACKGROUND OF THE INVENTION

Information exchange and consequently the transfer of data between and across a variety of systems and across networks has become prevalent and a necessity in today's society. The volume of data transferred and the need for timely transfer of data are constantly on the rise. However, the medium and the means for conveying data are typically plagued with physical limitations, such as the bandwidth of the networks. As such, there exists a need for a resolution that will meet user demand but remain within the bounds of the physical network.

Historically, a computing system in which one or more client machines communicate with one or more servers over a network is a common arrangement. For example, there are millions of personal computers (PCs) connected to the Internet for communication with various servers. Many of these PC users acquire new or updated software on their PCs by downloading the software from a remote server over the Internet. In addition, users also often provide data and information that must be uploaded to servers on the Internet or other such networks.

Conventional methods of uploading data files, such as pictures or other types of information to a system over a network such as the Internet, adversely impact the user's experience. This adverse impact is particularly noticeable when a low bandwidth connection is being utilized and when a large amount of data is being uploaded. Even with increased processing speeds for PCs, it is the bandwidth of the communication link, along with the transfer of unnecessary information, which is becoming a significant bottleneck to the user's experience. For example, when a user wants to upload a photograph to a server, the resolution of the photograph (which directly corresponds to the quantity and type of information that has to be transferred) determines how much data is transferred. For instance, if a process to be performed on a server only requires a low resolution quantity of data, conventional methods will transfer the same photograph files (JPEG, Bit map, GIFF and so on), as would be transferred for a high resolution use. In other words, conventional methods for uploading such a photograph do not take the issue of resolution into account, particularly whether or not all of the communicated data is necessary and should therefore not be uploaded. Moreover, the time involved in transferring 'unnecessary' data results in not only the waste of significant network resources, but also a sluggish user experience and a further limitation on the user's ability to engage in other network activity.

In another example, conventional methods relating to online printing have the user upload all of their files, which could take hours. The user is then allowed via a browser or other such interface, to manipulate, select, and specify sizes or number of desired copies from the uploaded server resident pictures. As such, it is quite possible and often the case that some of the uploaded information was neither required nor utilized and need not have been uploaded.

In light of the foregoing, there exists a need to provide a system and method that will optimize the uploading of information particularly for low bandwidth connections. Furthermore, there is a need for a system and method that provides an effective method to specify the format and data to be uploaded as determined by the destination system so that interference with other network activity is minimized. While one potential solution is simply to increase network bandwidth, increased bandwidth is expensive and has historically been followed by increased user demands. Thus, even as available bandwidth increases with technological advances, there will continue to be a need to eliminate interference with other network activity, minimize unnecessary uploads and reduce data volume.

SUMMARY OF THE INVENTION

The present invention is directed to a method and system for use on a computer for uploading information from a client to a server by describing, on the client side, a file which identifies and describes files to be uploaded. The present invention further allows the destination server to refine the contents of the text file created by the client, to identify the files that the server requires, or to further specify how to transform any other related data.

The present invention is directed to a method and system for transferring information from a source computing device to a destination computing device by identifying a data file on the source computing device, portions of which may be transferred to the destination computing device, for use in performing a desired task by the destination computing device. Then generating an information file on the source computing device that contains a description of certain attributes of the data file. The destination computing device can access the information file and determine the portions of the data file that will be needed to perform the desired task. The destination computing device then specifies within the information file, the portions of the data file that are needed. The source computing device then utilizes the information file as specified by the destination computing device to ascertain and upload the appropriate portions of the to the destination computing device, so that only the needed portions of said data file are transferred to the destination computing device.

Further, the present invention provides a security scheme to limit information that can be accessed by a server application on the client computing environment by assigning a unique identifier to each file that is be uploaded, on the source computing device and maintains a copy of the assigned pairs of unique identifiers and items. The generated information file contains the unique identifier and attributes descriptive of the file. The information file is accessed and modified by the destination computing device to specify the information that is needed to perform the desired task. Files are upload by the source computing device according to the entries in the information file which are consistent with the previously assigned pairs or identifiers and files.

Even further, the present invention provides a system and method that allows a server or network application to utilize and render information that is resident on a client system.

Further still, the present invention provides a system for uploading data from a source computing device to a destination computing device that comprises an identification component that enables the selection of one or more items within a file on the source computing device, where that file contains data for each of the items. There is also an information file on the source computing device that has entries corresponding to each of the one or more items, and an upload component that is configured to utilize the entries within the information file to specify which data on the source computing device will be needed to perform a desired task on the destination computing device.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims.

BRIEF DESCRIPTION OF THE SEVERAL VIEWS OF THE DRAWING

The present invention is described in detail below with reference to the attached drawings figures, wherein:

FIG. 3 is a schematic view illustrating a method of the present invention; and

FIG. 4 is a flow diagram illustrating particular steps of the manifest creation found in FIG. 3.

DETAILED DESCRIPTION OF THE INVENTION

The present invention provides a system and method that enables a client system to describe files that are to be uploaded to a server, while also allowing the server to define the files that it wishes to receive and to further specify how the client should transform any related data. According to the method of the present invention, within an XML based text file, a client system first identifies and describes characteristics of files that are to be uploaded. Next, the text file is accessed and can be modified by a server, in order to specify the files that the server requires. The server's specification is on the basis of the other criteria that were previously provided in the XML file by the client system. Following this, the XML file is further referenced and interpreted by the client system, to determine the particular files that should be uploaded to the server. In effect, the system and method of the present invention enables a source system to exchange information with a destination through the specification of a 'property bag'. The property bag can then be modified by the destination and re-read by the source utilizing tags found therein. A 'property bag' can be thought of as an assorted collection of miscellaneous data, variables and other information that program developers need to transfer between systems (which as identified a specified or unique tags within a XML file). It would be understood by those skilled in the art that while the present invention is described with reference to a client and server, the system and method is applicable to communications between any two or more computing environments, and such communication should be considered within the scope of the present invention. The particular embodiments described herein are intended in all respects to be illustrative rather than restrictive. Alternative embodiments will become apparent to those skilled in the art to which the present invention pertains without departing from its scope.

Having briefly described an embodiment of the present invention, an exemplary operating environment for the present invention is described below.

Exemplary Operating Environment

Figure 1:
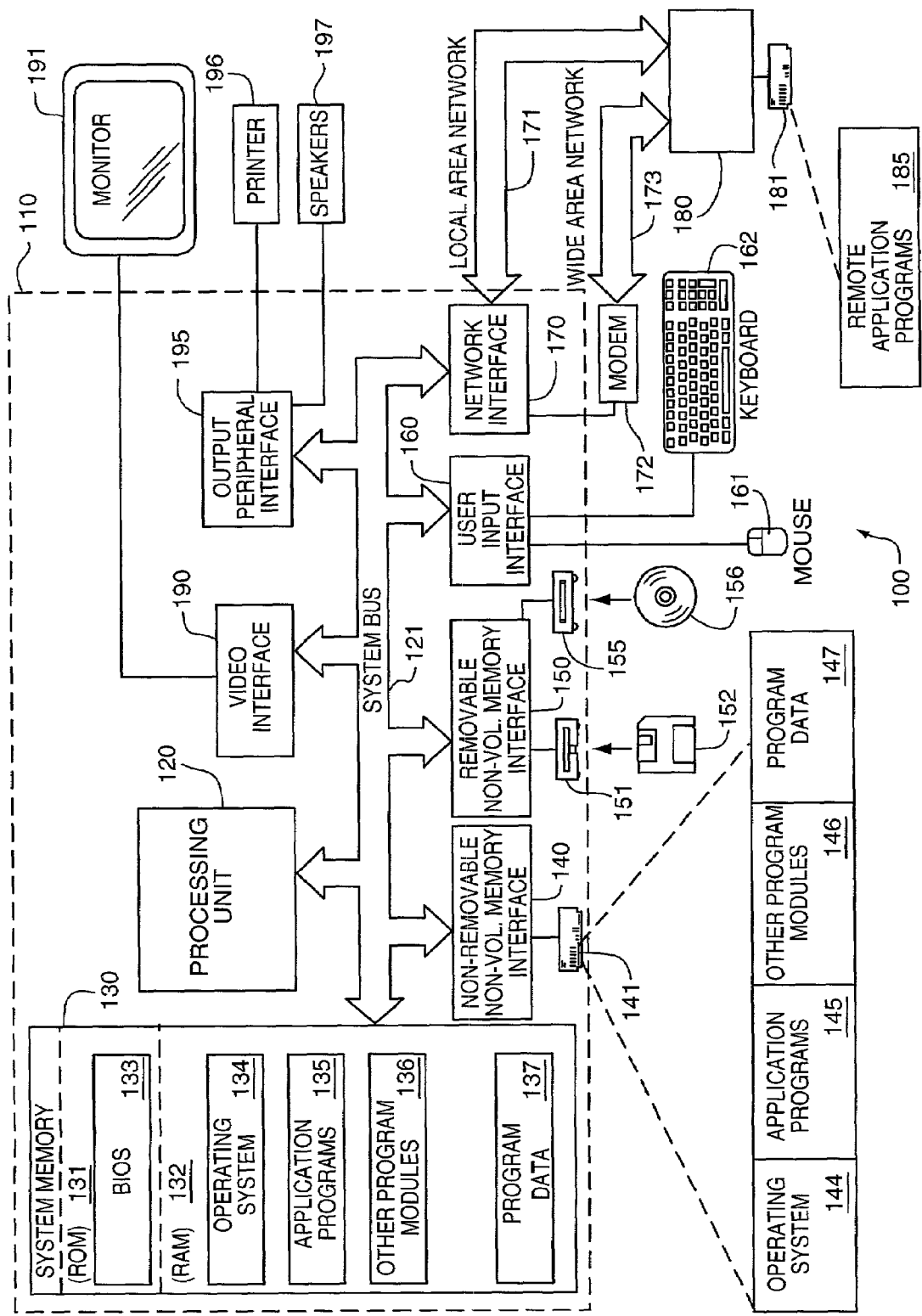
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. Examples of computer storage media include, but are not limited to, RAM, ROM, electronically erasable programmable read-only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system, or necessary portion thereof, from the hard disk drive 140 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

System and Method for Describing Files to be Uploaded

The present invention is directed to a system and method for identifying and describing within a text file, information relating to files, which are to be transferred from one system to another for the purpose of implementing particular tasks. The transfer of files will be discussed in the context of a transfer from a client system to a server system on a network, otherwise referred as an upload. The file upload description of the present invention involves the creation of an XML text file. The XML file contains tags that describe the files to be uploaded, as well as tags that provide other types of information including, but not limited to, things such as file locations, file size, and file content characteristics. In the case of an image, the content information could include things such as image resolution, size and so on. The XML file can also contain meta-data, which is extraneous information that a developer seeks to pass between systems. Finally, the XML file facilitates the retrieval of information. As would be understood by those skilled in the art, other forms of structuring data besides XML can be used to provide the functions described herein and are considered within the scope of the present invention.

In one embodiment, the files to be uploaded and the associated descriptions relate to the uploading of photographs from a client system to a photograph service provider (e.g., KODAK, WALGREENS or some other provider that can provide various services for the user, such as printing, enlarging, storing pictures and so on). It will be understood and appreciated, however, by those of skill in the art that the system and method for describing files to be uploaded provided by the present invention may be utilized to conduct a transfer of information relating to any number of items and between any number of systems, other than photographs to an internet photo service provider. Such transfers are contemplated by and are within the scope of the present invention.

Continuing with the exemplary upload of a photograph there are many tasks that a user may want to perform with respect to the photos. Traditionally, when a user wants to perform a function, such as publishing or online printing of photographs that are located on their local computer, the user can locate a photo service provider site on the internet ("site") to accomplish the task. In the traditional method, the user will typically first upload the file or files relating to all of their pictures. Due to the volume of data, this process can be time consuming, thus degrading the user experience. From these uploaded files the site then displays thumbnails or other visual representation of individual photographs or picture frames, to allow the user to meaningfully identify those pictures for which they require service. For example, a user may want to specifically request a certain number of prints, sizes, resolution etc. for only certain individual pictures from the file. Of course, the user may also request all the pictures from a file. In this traditional method, the entire file is uploaded regardless of the number of pictures involved. In other words, the entire file is uploaded regardless of whether the user desires only one print of one picture or two prints of every picture. As would be understood by those skilled in the art, the uploading of images can be extremely time consuming in addition to the fact that it requires a large amount of communication bandwidth, due to the volume of data involved.

Figure 2:
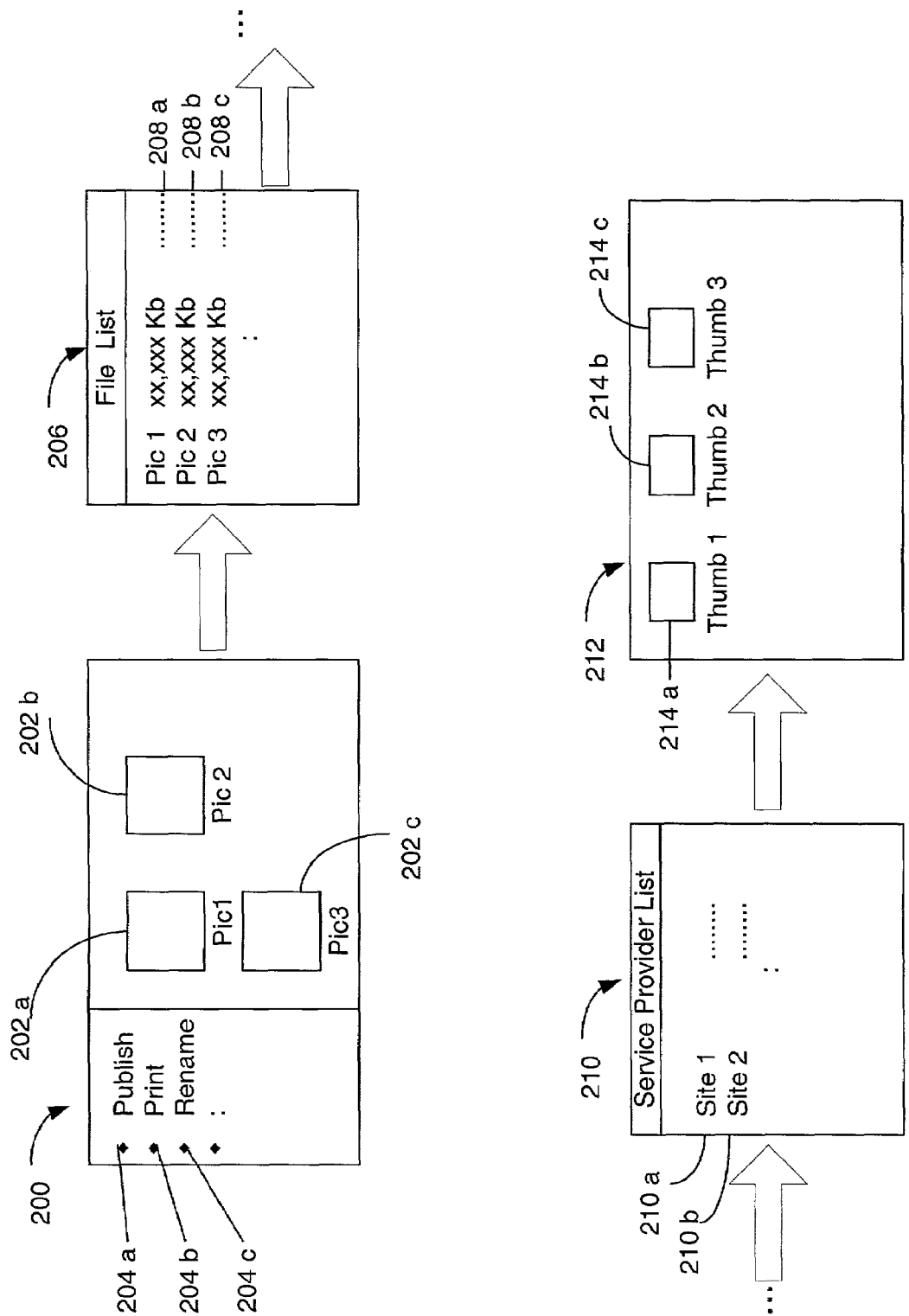
FIG. 2 is a schematic diagram, illustrating an end user's perspective of an embodiment of the present invention.

The present invention addresses this problem by eliminating the need to transfer the entire file in all cases. An embodiment of the present invention will be described with reference to FIG. 2, which provides the user experience framework for the present invention, followed by a more detailed discussion with reference to FIGS. 3 and 4 on particular steps and events that occur in conjunction with the screen displays of FIG. 2. Referring initially to FIG. 2, exemplary screens of the system and method of the present invention are shown. A user may have a collection of files or pictures on their system which they wish to publish, print or on which they wish to otherwise perform other tasks. Typically, either the operating system or some specific application program facilitates the user's ability to selectively fulfill this desire. For example, the user may have a collection of pictures stored on the user's computer. The computer has an operating system or a specific application program that displays the pictures and the available tasks. For example, in FIG. 2, a screen display 200 can be presented to the user. Within screen 200, the pictures 202 for the particular collection are shown, along with a list of possible tasks 204. More specifically, the ability to select a task or function, such as publish 204a, print online 204b or rename 204c, is presented to a user on screen 200 with respect to pictures pic1 202a, pic2 202b, and pic3 202c which reside on the user's system. In response to the user selection of a desired task 204, a file list 206 is presented to the user, listing files to which the selected task would be applicable. For example, if the user selected print online task 204b, each of the files corresponding to pic1 202a, pic2 202b and pic3 202c would be displayed in list 206 with corresponding file names 208a, 208b and 208c. As shown, other information, such as the size of each file, may also be presented. After selecting one or more of the displayed filenames 208a, 208b, 208c from the list 206, the user is presented with a service provider list 210. The list 210 contains a number of available service provider sites, such as 210a and 210b. From the provider list 210, the user can select a site of his or her choosing that will process the selected pictures according to the selected task 204, in this case the print online task 204b. Generally, the selected provider site 210a, 210b will display a thumbnail screen 212. The thumbnail screen 212 displays thumbnail images 214 corresponding to the selected files 208. The user can then confirm or change the services requested for each of the thumbnails 214. The completion of the selection process ultimately results in the actual files being uploaded from the user system to the network site for processing. It should be understood that the description of FIG. 2 reflects only the user's experiences and not all of the other events and functions that underlie the screen displays of FIG. 2, which are explained more fully below. Importantly, the entire collection of pictures is not uploaded to the site in all instances. Rather, only those files selected for further processing are uploaded.

Turning now to FIG. 3, the steps of the present invention, which represent the underlying logic of the screen shots of FIG. 2, are shown. In accordance with the previous discussion respecting FIG. 2, the selection of a task by a user is represented at step 300, followed by a listing of target files at step 302, and then a listing of service providers at step 304. Again, sample tasks for the images example might include publishing to a server site or requesting prints online. In the photograph example, the target files include various image files. Following a user's selection of a service provider, the provider's HTML page is downloaded to the user's system, as in any traditional web site access. This process is shown as step 306. However, the similarity ends there. Unseen and unbeknownst to the user, within the system and method of the present invention, the download of the HTML page also triggers the creation of a file, which is identified as a manifest shown in step 308. A manifest as used herein, can be a text file such as an XML file, a non-text file, or any other data structure, which allows the description of lists and meta-data relating to information that is to be transferred from one system to another. The manifest is available to a client-side script through a named property that is known to both the client and the server. An example of such a service is a property bag. A property bag provides a way to make the manifest and other data accessible to a script. As would be understood by one skilled in the art, the property bag could be a data structure that is a collection of variables of any type, including complex types like XML documents. These variables are referenced by property names. Within this invention, such a property bag that is accessible via client-side script will contain one property that is the XML manifest. The property bag may also contain other properties that provide different information such as the user interface language identification—'user UI language ID", to the server. Specified in this manifest are certain properties and attributes relating to the files and pictures of the file list 206. Particularly, the properties and attributes for the files which are to be uploaded to the provider's site are specified. For example, a manifest may contain file names, the location of the files on the user's system, and in the case of photographs, the resolution, size and so on for the various pictures. A more detailed discussion of the XML text file and its content is more fully set-forth below with reference to FIG. 4.

As mentioned above, there is a download 306 of a default HTML page from a provider to the user's system. In conjunction with this page download, and in accordance with the present invention, a script is also downloaded from the provider. The script executes to access the property bag of the client system. In other words, a script from the provider is able to read and edit the manifest file 308 that is created and resident on the user's system, shown at step 310. In another embodiment of the present invention, the manifest file is transmitted to the provider system and then retransmitted back to the client after the provider system's edits. Irrespective of how the modification of the manifest occurs, the effect is that the provider is able to utilize client side information in ways that will be discussed later. As shown in step 312, the client side of the present invention ultimately reads and utilizes the modified manifest file to determine which files on the client system to upload to the server. The client side is also able to determine what, if anything, must first be done with the files, such as reformatting, recompressing, etc. before uploading the files.

The details of the aforementioned manifest creation step 308 will now be discussed with reference to FIG. 4. In particular, on the client side system there is first the creation of an internal data structure that maps filenames to unique identifiers, as shown at step 400. In other words, each of the files that is to be potentially uploaded to the server (i.e. those to be specified in the manifest file), are assigned a unique identification number. This unique identification number is then used for subsequent file transfer requests from the server. This is followed by the specification of other tags, file names, unique identifiers and other meta data in the manifest, at step 402. In order to facilitate the discussion relating to a manifest and its content, a sample XML manifest file is shown as follows:

```
<TM>
    <file list>
    <file ID = 1 Name = "foo" Source = "C:\mydocs\pictures\">
        size = "32,000"
    <meta data>
        <Image ID = "CX" > 300 (Image)
        <Image ID = "CY" > 400 (Image)
    <\meta data>
<\file>
```

As would be understood by those skilled in the art, both the format syntax, concept and specification of entries within the manifest are a part of XML and should not be considered a limitation of the present invention.

As shown in the sample file, a unique identifier—'ID', a file name—'foo', the location of the file on the client system—'c:\mydocs\pictures\' and a file size—'32,000' bytes, along with other image related meta-data are specified by a client system. It is worthy of note, that the unique identifier is provided in order to introduce a certain level of security with regards to the client side information that can be accessed by a server. As previously mentioned, a server script which is downloaded with the default HTML, is able to modify the manifest document at 310. This also means that a rogue or scrupulous script could potentially alter the name of a file, or a file location that was previously specified within the manifest, thus attempting to request files other than what the user intended to send. The method of the present invention guards against this event by utilizing the unique identifiers field within the manifest document, rather than the filename or file location for selecting a file to upload. In operation, a client system obtains the unique identifier from the manifest and then the unique identifier is cross referenced within the internal data structure that was concurrently created with the manifest file, to determine the corresponding file names and location that should be sent to the server. Thus, any alterations of a file name or a file location on the server side would be ignored by the client.

The method of the present invention also allows the server side, otherwise the provider, to persist orders that a user makes. In other words, the information contained within the final version of the manifest, i.e. the one utilized in an upload, is preserved on the server and may also be preserved on the client, thus further minimizing the need to upload information that had been previously uploaded to the server. For example, if at one time a user had requested a reprint of a particular photograph, the manifest information pertaining to that request, along with the affiliated data that was provided at that time, is saved on the server and potentially also on the client. As such, when the user at a later date, requests another print of the same picture (assuming all of the related attributes and meta-data is also applicable), the server can modify the manifest of the second request to exclude the files or data associated with the prior print, because it already has that information. In other words, if the reprint was requested for a picture PIC1, a tag or other entry relating to PIC1 is provided in a manifest. A server, in the second instance will remove the reference to PIC1 from the manifest, so that no information relating to PIC1 will be uploaded by the client. Conversely, if it turns out that there is only a slight variation in the new request, the server can also modify the manifest to reflect an upload of only the incremental or varied portions of the information, by editing or creating tags and specifications with the manifest, in accordance with XML syntax.

Yet another provision of the system and method of the present invention relates to the ability to have a server provide an indication to the client side, which allows the client to display or utilize information that is locally resident on the client without having that information first uploaded to the server and then sent back to the client for display. For example, in order for a user to select specific pictures on which particular operations will be performed, thumbnails of the pictures are usually displayed to the user to facilitate such selection. Traditionally, as described earlier, thumbnails that would be displayed to a user are based on picture files that would have to first be uploaded to the server. Conversely, the present invention allows a server, through specifications and edits in the manifest document, to instruct the client to display thumbnails of pictures that are resident on the client without the need for an initial upload to the server.

Furthermore, the present invention enables a server to provide instructions on sizing and any re-sampling that may be necessary to provide more losy files on the client side through manifest edits. For example, a server will specify a resolution change within the manifest file, such as changing from a resolution of 2000×1000 to a resolution of 1000×500, when all that is required for a selected user function is an outline of a picture. Such an edit diminishes the quantity of data that has to be uploaded. In other words, the method of the present invention prevents the upload of all of the data that would be needed to create a high resolution picture when the user is only requesting a wallet size print of the picture.

The present invention has been described in relation to particular embodiments which are intended in all respects to be illustrative rather than restrictive. Alternative embodiments will become apparent to those skilled in the art to which the present invention pertains without departing from its scope.

From the foregoing, it will be seen that this invention ion one well adapted to attain all the ends and objects set forth above, together with other advantages which are obvious and inherent to the system and method. It will be understood that certain features and sub-combinations are of utility and may be employed without reference to other features and sub-combinations. This is contemplated and with the scope of the claims.

We claim:

1. A method for transferring data to a destination computing device, comprising:
    receiving, by the destination computing device, a request from a source computing device to upload one or more portions of a data file located on the source computing device to the destination computing device;
    accessing, by the destination computing device, an information file received from the source computing device that is associated with the one or more portions of the data file, the information file containing one or more metadata descriptors of the one or more portions of the data file to be uploaded;
    determining, by the destination computing device, based on the one or more metadata descriptors, one or more portions of the data file needed to be uploaded to the destination computing device to perform a desired task;
    modifying, by the destination computing device, at least one of the one or more metadata descriptors to create a modified information file, the modified information file specifying the one or more determined portions of the data file; and
    obtaining from the source computing device, by the destination computing device, the one or more determined portions of the data file as specified by the modified information file.

2. The method recited in claim 1, wherein the modified information file instructs the source computing device to perform an operation on the data file, wherein the instruction is specified as an entry in the modified information file by the destination computing device.

3. The method as recited in claim 1, wherein modifying the information file includes a modification of a reference in the information file to the data file.

4. The method as recited in claim 3, wherein the modification is a removal of the reference to the data file from the information file, to prevent an upload of the data file and portions thereof.

5. The method as recited in claim 3, wherein the modification of the information file is a modification of one or more characteristics of one or more pictures that is to be transferred from the source computing device to the destination computing device for use in performing a task on the one or more pictures.

6. The method as recited in claim 5, wherein the modification of the information file is a specification of any needed transformation requirements to the one or more pictures.

7. The method as recited in claim 1 wherein the information file is a manifest.

8. The method as recited in claim 1 wherein the information file is a text file conforming to an XML schema.

9. A computer system having a processor, a memory and an operating environment, the computer system operable to execute the method recited in claim 1.

10. A computer readable storage medium executable instructions for performing the method recited in claim 1.

11. A method for uploading data from a source computing device to a destination computing device, comprising:
    identifying a data file on the source computing device;
    generating an information file on the source computing device, wherein the information file is generated by the source computing device and contains one or more metadata descriptors relating to one or more portions of the data file;
    accessing, by the source computing device, a modified information file to identify one or more portions of the data file that are to be uploaded to the destination computing device, wherein the modified information file is a modified version of the information file, is created by the destination computing device, and specifies the one or more portions of the data file needed to be uploaded to the destination computing device to perform a desired task; and
    uploading the identified one or more portions of the data file to the destination computing device as specified by the modified information file.

12. The method as recited in claim 11, further comprising modifying one or more portions of the data file as specified by the modified information file before uploading to the destination computing device.

13. A computer system having a processor, a memory and an operating environment, the computer system operable to execute the method recited in claim 11.

14. A computer readable storage medium having computer executable instructions for performing the method recited in claim 11.

15. The method as recited in claim 11, further comprising downloading a script from the destination computing device, wherein the script accesses the information file to create the modified information file.

16. A method for use in a networked computing environment for securely uploading items from a source computing device to a destination computing device to allow the destination computing device to perform a desired task, comprising:
    assigning, on the source computing device, a unique identifier for each item to be uploaded and maintaining information of assigned pairs of the unique identifiers and each item on the source computing device;
    generating an information file containing at least one of the unique identifiers and one or more metadata descriptors of the items to be uploaded;
    accessing, by the source computing device, a modified information file to identify one or more items to be uploaded to the destination computing device, wherein the modified information file is a modified version of the information file, is created by the destination computing device, and specifies the one or more items needed to be uploaded to the destination computing device to perform a desired task; and
    uploading the identified one or more items as specified by the modified information file.

17. The method as recited in claim 16, wherein the information file is a textual description of file lists and file meta-data.

18. The method as recited in claim 16, wherein the information file is a non-textual description of file lists and file meta-data.

19. The method as recited in claim 16 wherein the information file is an XML based file describing the one or more items to be uploaded and meta-data about the items.

20. A computer system having a processor, a memory and an operating environment, the computer system operable to execute the method recited in claim 16.

21. A computer readable storage medium executable instructions for performing the method recited in claim 16.

22. The method as recited in claim 12, further comprising downloading a script from the destination computing device, wherein the script accesses the information file to create the modified information file.

* * * * *